W. MORRISON.
ELECTRODE FOR REVERSIBLE GALVANIC BATTERIES.
APPLICATION FILED MAR. 11, 1912.
Reissued May 14, 1912.
13,420.
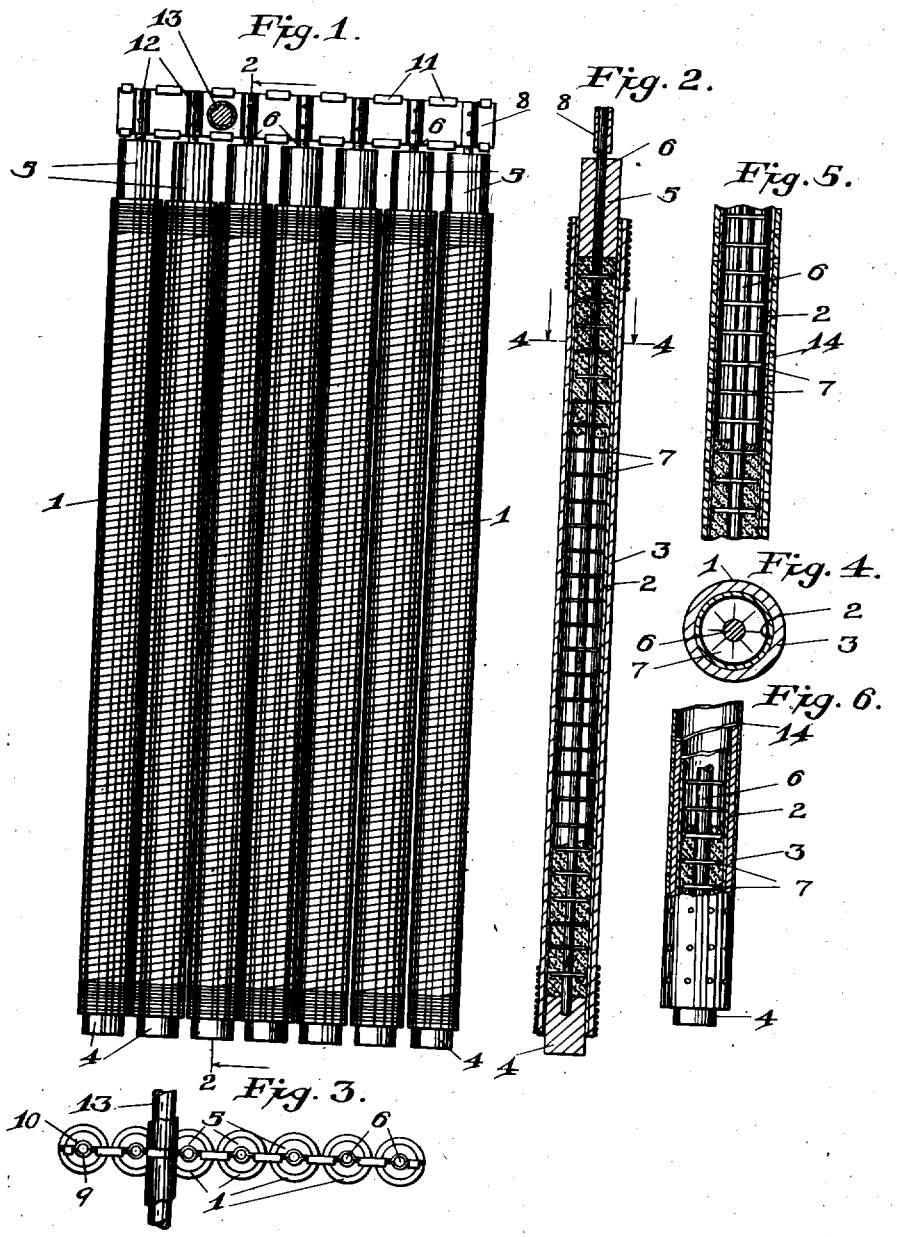
Witnesses
Robert J. Hulsizer.
C. H. Potter
Inventor
William Morrison,
by Byrnes, Townsend & Brickenstein,
Attorneys.

UNITED STATES PATENT OFFICE.

WILLIAM MORRISON, OF DES MOINES, IOWA.

ELECTRODE FOR REVERSIBLE GALVANIC BATTERIES.

13,420. Specification of Reissued Letters Patent. Reissued May 14, 1912.

Original No. 975,981, dated November 15, 1910, Serial No. 586,335. Application for reissue filed March 11, 1912. Serial No. 683,094.

*To all whom it may concern:*

Be it known that I, WILLIAM MORRISON, a citizen of the United States of America, and resident of Des Moines, Polk county, Iowa, have invented a certain new and useful Improvement in Electrodes for Reversible Galvanic Batteries, of which the following is a specification.

My invention relates to electrodes for reversible galvanic batteries, and more particularly to a positive electrode for use in a reversible battery in which an alkaline electrolyte is used.

Furthermore, my invention relates to a positive electrode in which the active material is a compound of zinc and chromium.

The object of my invention is the construction of an electrode having a central internal conductor about which the active material is held, whereby a very efficient operation of the battery is obtained.

A further object is to construct a highly improved and efficient electrode in a very economical manner.

These and other objects of my invention will be readily understood by reference to the accompanying drawings, in which—

Figure 1 is a front elevation of my improved electrode; Fig. 2 is a sectional view taken on line 2—2 of Fig. 1; Fig. 3 is a plan view; Fig. 4 is a sectional view taken on line 4—4 of Fig. 2; Fig. 5 is a detail sectional view of a modification; and Fig. 6 is a detail part in section of a further modification.

In the drawings, like reference characters refer to similar parts in the various figures.

As shown in Fig. 1, my improved electrode consists of a plurality of tubes 1. I have shown seven, although it is obvious that any suitable number may be used. Each of these tubes is constructed in the following manner: As shown in Fig. 2, they consist of an inner tube 2 of heavy paper or other suitable material. Surrounding this is a second tube of asbestos 3 about which is wound a binding of wire to strengthen the tube. The ends of the tube 2 are stopped up by suitable plugs 4 and 5 of wood or rubber or other such material, and passing through the plug 5 and extending part way into the plug 4 is a copper rod 6. Strung along this rod are thin copper washers 7. These washers are split as shown in Fig. 4, so that they may fit the rod rather tight and yet be slid into position. The number and distance apart of these washers may be varied, although I preferably place them from three-eighths to half an inch apart.

In Fig. 5 I show a modification in which the covering of asbestos and wire binding is replaced by a perforated metal tube 14. In Fig. 6 the asbestos tube is retained, but the metal tube 14 used in place of the wire binding. These tubes constructed in the above manner are connected together to form my electrode by means of a suitable connector 8 which is constructed of two strips 9 and 10 of metal, such as copper or nickel, in which are corresponding semi-circular depressions. The section 10 has a plurality of extensions which are clamped over the edges of the section 9 to firmly hold the two together. The ends of the rods 6 of the various tubes are then inserted in the circular opening formed by the two corresponding semi-circular depressions. Indentations are then made with a sharp tool as shown at 12, so as to hold the rods in the connector in a manner well understood. Passing through a suitable opening in the connector is a bolt 13 by means of which a plurality of electrodes may be connected together in a completed battery, means being provided whereby this bolt is connected to one terminal of the battery. The active material is placed between the washers 7 and surrounding the copper rods 6. The active material which I prefer to use in these tubes is that described in my Patent No. 975,885, granted November 15, 1910, which consists of a compound of zinc and chromium mixed with mercury oxid, which oxid is reduced under the electrolytic action, and in this reduced state acts as an amalgamator for the zinc.

By having the main conductor in the center of the active material, I obtain highly improved results, as during the charge of the battery the electrolytic action seeks the best conductor, and, therefore, by my construction this electrolytic action commences on the inside and works out. This method of operation is very essential for the proper operation of this electrode, for the following reasons: The nascent hydrogen combines with the oxygen of the zinc-chromium compound, which forms the active material in the tube and the potassium hydroxid combines with the chromium compound of this active material to form a potassium-chromium-oxygen compound. By having this central conductor, it will be readily seen that the electrolytic action takes place entirely inside of the tube and works outward, so that substantially all of the active material is acted upon more quickly and thoroughly. Furthermore, in the working of this electrode it is necessary that there be a concentrated solution of the potassium hydroxid inside of the electrode, in order that this hydroxid may combine with the chromium of the zinc-chromium compound under the electrolytic action in the most effective manner to form a potassium-chromium compound, so that the zinc may be reduced to the metallic state. If an external conductor were used, the potassium hydroxid would be broken up on the exterior of the tube to a great extent, and the hydrogen liberated would escape through the solution into the air, and would not act upon the zinc-chromium compound to reduced the same. Likewise the potassium oxid would unite with the water in the electrolyte to form potassium hydroxid, which would be in the solution instead of being in a concentrated solution among the active material. It will accordingly be seen that with this arrangement a proper operation of my electrode would not be attained.

It is further noted that it is necessary that there be a concentrated solution of potassium hydroxid inside of the tube. This concentrated solution is necessary to obtain a powerful discharge of the battery, in addition to the reasons above noted. This solution is more concentrated than that of the electrolyte, and it is for that reason that it is very important that the active material be confined within the porous tubes described, so that there will be very little free circulation of the potassium hydroxid from the inside to the outside of the tube, as under these conditions it would be impossible to maintain the strong solution necessary upon the inside of the tube. Furthermore, I find it best to form the tubes cylindrical, as in this shape they are better able to resist the pressure from the inside, which is caused by the change in the condition of the material during the charge and discharge of the battery, as I have found that during this charge and discharge the material within the tube undergoes a complete structural change, and is under considerable pressure.

It is important in the charging of this battery that during the first stage it be charged at a high rate, in order to create a high electrolytic density to carry the elctrolytic action immediately to the central conductor of the tube. This rate of charge may be cut down after the battery is partially charged, but for the best operation the rate of charging should be maintained slightly higher than the rate at which it is desired to discharge the battery.

A further important feature of the construction of my improved electrode is in the provision of the plugs 4 and 5 through which the conductor 6 passes. These plugs protect the ends of the rod so that the tubes may be surrounded with the electrolyte up to a point above the top of the tube, and yet a very small amount of the current will pass directly to the upper end of this conductor on account of the same being protected by the insulating plug. The lower end of the rod is protected in the same manner by the plug 4.

What I claim as my invention is:

1. An electrode for reversible galvanic batteries, in which an alkaline electrolyte is used, consisting of one or more tubes of porous material, each of said tubes consisting of a series of cells within which the active material is held.

2. In an electrode for reversible galvanic batteries, in which an alkaline electrolyte is used, a tube of porous material, suitable plugs in the ends thereof, a metallic rod extending through said tube and said plugs, a plurality of washers placed on said rods whereby said tube is divided into sections, and active material held in said sections.

3. In an electrode for reversible galvanic batteries, in which an alkaline electrolyte is used, a tube consisting of an inside lining of paper surrounded by a layer of asbestos and a wire binding on the exterior thereof, a metallic rod extending through the center thereof, and division plates on said rods dividing said tube into sections and active material in said sections and surrounding said rod.

4. A negative-pole electrode for reversible galvanic batteries, in which an alkaline electrolyte is used, consisting of one or more tubes electrically connected by means of a suitable connector, a metallic rod extending through the interior of each tube, and active material consisting of a zinc chromium compound placed within said tubes and surrounding said rods.

5. In a positive electrode for reversible galvanic batteries, in which an alkaline electrolyte is used, a tube of porous material, a metallic rod extending through said tube, and active material consisting of a zinc chromium compound surrounding said rod.

6. In a positive electrode for reversible galvanic batteries, in which an alkaline electrolyte is used, a tube of porous material, a metallic conductor extending through said tube, and active material containing a chromium compound surrounding said conductor.

7. In a positive electrode for reversible galvanic batteries, in which an alkaline hydrate electrolyte is used, a tube of porous material, a metallic conductor extending through said tube, and active material, containing zinc and a compound adapted to reduce the solubility of the zinc in the alkaline hydrate solution, surrounding said conductor.

8. An electrode for reversible galvanic batteries, containing a chromium compound held within a porous tube.

9. An electrode for reversible galvanic batteries, comprising a support and conductor, active material thereon, and a permeable metal sheath surrounding but electrically insulated from said active material.

10. An electrode for reversible galvanic batteries, comprising a support and conductor, active material thereon, a porous envelop inclosing said active material, and a permeable metal sheath surrounding said envelop.

WILLIAM MORRISON.

Witnesses:

EUGENE A. BYRNES,

ETHEL DANIELS.